United States Patent [19]

Mercer et al.

[11] 4,435,902

[45] Mar. 13, 1984

[54] ARTICULATED BOOM WATER JET CUTTING APPARATUS

[75] Inventors: John E. Mercer; John H. Olsen; Stephen Elkins, all of King County, Wash.

[73] Assignee: Flow Industries, Inc., Kent, Wash.

[21] Appl. No.: 216,910

[22] Filed: Dec. 16, 1980

[51] Int. Cl.³ ............................................. B26F 3/00
[52] U.S. Cl. ................................. 30/296 R; 83/53; 83/177; 299/17
[58] Field of Search ..................... 83/177, 53; 299/17; 30/296 R, 296 A, 123.3

[56] References Cited

U.S. PATENT DOCUMENTS

| Re. 9,455 | 11/1880 | Reid | 30/296 R X |
|---|---|---|---|
| 1,830,688 | 11/1931 | Bach | 30/296 R |
| 2,584,620 | 2/1952 | Rubin | 30/296 R X |
| 3,014,494 | 12/1961 | Scott et al. | 83/177 X |
| 3,809,318 | 5/1974 | Yamamoto | 299/17 X |
| 3,873,159 | 3/1975 | Dabell et al. | 299/17 X |
| 3,886,658 | 6/1975 | Wikoff | 30/296 R X |
| 4,007,652 | 2/1977 | Shinomiya et al. | 83/177 X |
| 4,081,200 | 3/1978 | Cheung | 299/17 OR |
| 4,094,549 | 6/1978 | Shoji et al. | 299/17 OR |
| 4,193,634 | 3/1980 | Nakamura et al. | 299/17 OR |

Primary Examiner—Frank T. Yost
Attorney, Agent, or Firm—Don R. Mollick; Gregory W. Moravan

[57] ABSTRACT

A fluid jet cutter using an articulated boom support system is disclosed. The cutter utilizes a support system which allows rotational translation in all three axes. The boom system allows displacement of the cutter over a broad area. A jet catcher is attached to the cutter head to catch the cutting jet. A deadman switch arrangement prevents the operator from contacting the cutting jet. A vacuum system is linked to the catcher and a column that supports the boom to remove cutting debris and waste fluid.

11 Claims, 3 Drawing Figures

ARTICULATED BOOM WATER JET CUTTING APPARATUS

BACKGROUND OF THE INVENTION

1. Field of the Invention

This invention pertains to cutting apparatus, particularly fluid jet cutting apparatus that uses a jet of high velocity fluid as a cutting tool, and with still greater particularity, to fluid jet cutting apparatus adapted for motion in at least two dimensions.

2. Description of the Prior Art

Many systems for cutting sheet-like materials have been developed in the past. The most common apparatus used are various types of mechanical saws that operate by moving a series of teeth past the object to be cut. The teeth may be mounted on a disk or band, or strip, and the motion may be continuous, as in a band saw, or reciprocating, as in a saber saw. All saws generate waste chips to the action of the teeth. This waste must be removed to allow action of the saw, particularly when the substance being cut generates inflammable or dangerous waste, such as, graphite fibers or asbestos. The waste problem has led to the introduction of vacuum or fluid flushing systems to remove waste chips or debris. The adoption of composite materials, such as glass or carbon reinforced resins has increased the wear problem on metal cutting teeth, as such materials are harder than most metals. Additionally, many synthetic materials can flow or melt when in contact with the rapidly moving teeth. These, and other problems have led to the development of alternative cutting systems.

The first class of alternative system is that using mechanical means for cutting. Examples include: routers and knives of various types. Systems such as these can lessen, but not eliminate, the problems inherent in saws, as there are still mechanical parts subject to wear, and some generation of chips.

A second type of cutting system is that of using thermal means for cutting. An example is flame cutting torches. Obviously, this method is unsuitable for inflammable materials. Other thermal cutting methods include hot wires and lasers. Hot wires are often used to cut thermoplastics as to generate little waste. Toxic fumes can result, however, and the wires will not penetrate many reinforcing materials, In some industries, high powered lasers have been used to cut materials. The laser has the capability of cutting a wide variety of materials, while producing a narrow kerf with few chips, and little dust. The laser is, however, inefficient in that a large power supply is needed, and the high temperature can lead to production of noxious fumes. For the above reasons, thermal methods cannot be used with many materials.

The third method used for cutting materials, is water jet cutting. In water jet cutting, a source of ultra high pressure water or other fluid is forced through an orifice to form a small diameter stream of high velocity fluid. The pressures used are commonly in the vicinity of 50,000 psi. This high speed jet cuts through most materials, including hard reinforcers, such as carbon fibers or glass. Since the jet is very narrow, only a very small kerf is created, resulting in a very small volume of waste. What waste is created, is removed by fluids in the vicinity of the jet. The result is, almost no dust or chips are created. As the temperature is not elevated, no dangerous fumes are generated. Prior fluid jet systems have been limited to application where a rigid supporting frame can be used due to the necessity of providing a means to take up the reactive force of the jet, and support the supply tubes. Accordingly, conventional water jet cutting apparatus lacks the flexibility found in routers and saws.

SUMMARY OF THE INVENTION

The invention provides a fluid jet cutting apparatus that has the flexibility of a handheld router or saw. The device is capable of cutting natural and man-made materials, including composite materials, such as, fiberglass resins and graphite epoxy. There is no generation of dust, chips, or noxious fumes while cutting. The device can be used as either a free hand device, or guided by patterns or tracks. On-off ability allows the use of the device to drill holes and cut inside cutouts.

The device is comprised of three subsystems. The first, a support subsystem provides support to the device, and allows a supply of fluid over a wide range of movement. The support system is constructed of a vertical column which is attached to the floor. The column can serve as a water-air separator as well as support. Attached to the column is a segmented arm whose lengths and sweeps are sufficient to cover the workpiece being cut by the system. Motion in all three axes is provided.

The tool subassembly includes the cutting jet and associated apparatus. The tool is attached to the supply line by swivel joints which allow rotation about all three axes to allow maximum flexibility. Two handles are provided to allow guiding the tool. The handles are provided with switches to control the on-off valve which, as a safety feature, prevents operation unless both hands are on the handles. The lower portion of the device contains a catcher to absorb the energy of the jet. The impact of the jet on the catcher counteracts the reactive force of the jet. The catcher is linked to the hands by a support which also serves as a channel for waste and fluid.

The vacuum system includes a vacuum pump. The vacuum pump is connected to the upper portion of the column which contains waste water in the lower portion. A tank of water at atmospheric pressure is connected to the bottom of the column. The top of the column connects to the waste water catcher of the tool by means of a waste line. The column thus helps to regulate the vacuum pressure of the system.

DESCRIPTION OF THE PREFERRED EMBODIMENT

Figure 1:
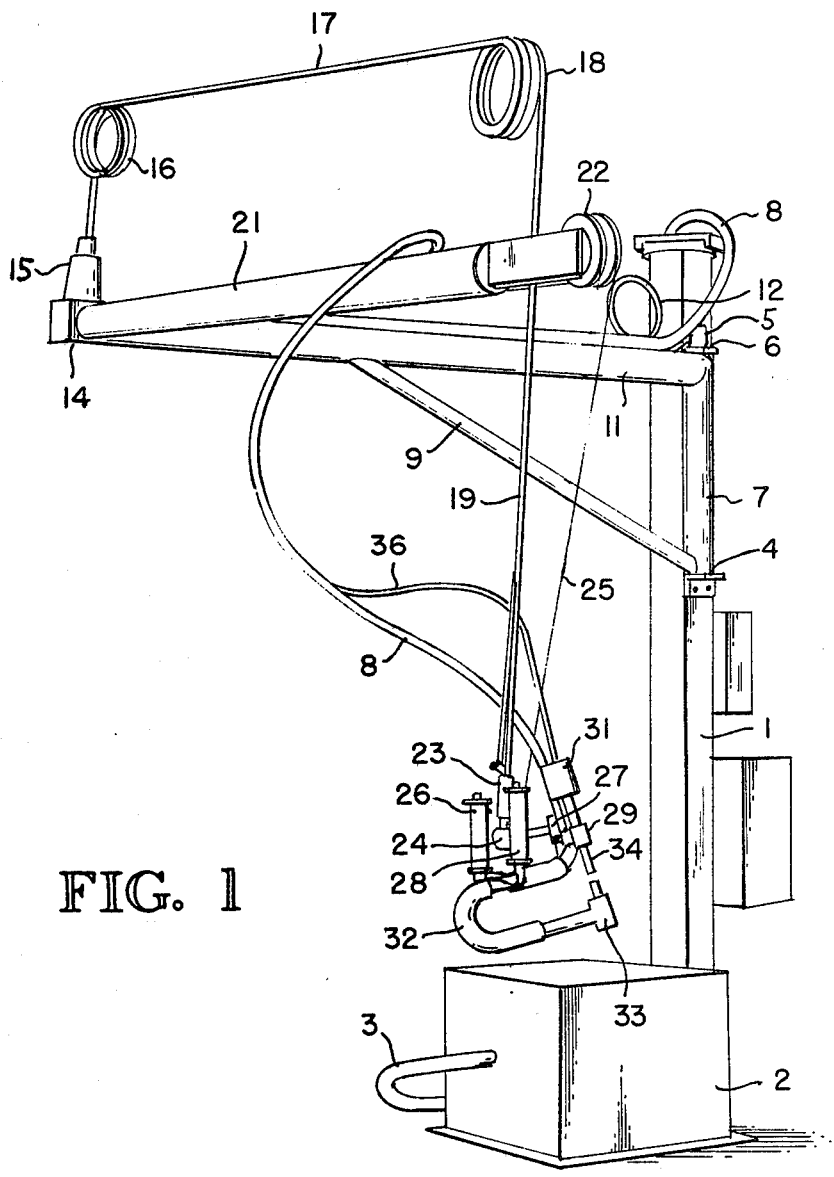
FIG. 1 is a perspective view of the invention.

FIG. 1 is a perspective view of the invention. The source of high pressure fluid for the cutting jet is not shown, but will be realized to be a high pressure pump or hydraulic intensifier. It is anticipated that several devices such as that illustrated in FIG. 1 could be operated off the same pump.

Most of the constituent parts of the invention are mounted to a substantly vertical column 1. Column 1 is hollow, and a tank 2 is attached to the base of column 1. A passage connects the interior of column 1 to the interior of tank 2. An overflow pipe 3 is provided on outside of tank 2. At the other or top end of column 1 is connected the waste line 8 of the invention. Line 8 connects to the interior of column 1. A source of reduced pressure, such as a vacuum pump (not shown), is also connected to the interior of column 1. Mounted to column 1, opposite tank 2 is a lower bearing 4 and an upper bearing 6, rotatively mounted between bearings 4 and 6, is pivot tube 7. Parts 4, 6 and 7 determine the pivot point of the first boom 11. A brace 9 connects the lower portion of pivot tube 7 to the center of boom 11. Waste line 8 runs along boom 11. Boom 11 is, thus, pivotable over about a 160° angle. The first spiral 12 of the high pressure supply line is located near the pivot point. Spiral 12 is a stress relief. A rotary joint 5 is located at the pivot point to supply high pressure fluid along boom 11 rotatably. At the end of boom 11, not connected to bearing 6, is connected a second pivot 14. Pivot 14 provides the pivot point for a second boom 21. A rotary joint 15 is attached to pivot 14 to allow the high pressure supply line rotation freely. Above rotary joint 15 is the second spiral 16 in the high pressure line. Spiral 16 allows the high pressure line to flex in the vertical direction, i.e., the angle formed by a straight section 17 of the supply line and the line between rotary valve 15 and spiral 16 can be varied. Similarly, a third spiral 18, allows flexing of the high pressure line to change the angle between straight sections 17 and 19. The use of spirals 16 and 18 allow movement of the tool in the vertical direction without the use of rotary joints. Attached to the end of the second boom 21, not attached to pivot 14, is a spring loaded cable reel 22. A cable 25, attached to reel 22 and the operating head of the tool, supports operating head of the tool. Straight section 19 of the high pressure line slideably passes through this end of boom 21, also. Waste line 8 runs along boom 21, also, but since waste line 8 may be made of flexible material there is no need for rotary joints or spirals. In conclusion, the support system described above, provides a means of support and supply of fluids to a tool over a wide range of movement in all three dimensions.

The remainder of the invention is the cutting jet head subassembly. The subassembly is support by cable 25 attached to spring loaded reel 22. The end of cable 25 not attached to reel 22, is attached to a X-axis swivel 23: X-axis swivel 23 is attached to the end of high pressure supply line section 19, and allows rotation of the subassembly around the X-axis, while allowing passage of high pressure fluid. Attached to X-axis swivel 23 is a Y-axis 24, which allows rotation of the subassembly in an axis at 90° to the X-axis, while allowing passage of high pressure fluid. Finally, a Z-axis swivel 27 attaches the Y-axis swivel 24 to the cutting head while allowing rotation around a third axis which is at 90° angles to the prior swivels axis, and also allows passage of high pressure fluid. The combination of swivels 23, 24 and 27 allow rotation of the cutting head in any direction, which when combined with the translation ability of the boom system, allows the head of the cutting system to move in any direction over an area fixed only by the length of the booms.

The cutting head is guided by two handles 26 and 28, which are attached to a U-tube 32. At one end of U-tube 32 is attached an elbow 29, which is the connection point for the Z-axis swivel 27. Elbow 29 does not open to the interior of U-tube 32, but serves to hold the central portion of a nozzle 34 which passes through elbow 29 and is connected to the high pressure flow. Flow through nozzle 34 is controlled by a solenoid 31 which has an actuator that passes through elbow 20. Solenoid 31 is actuated by switches in handles 26, 28, and is supplied with electricity by a supply line 36. Supply line 36 follows the path of waste line 8 to column 1, where it connects to a source of electricity (not shown). Waste line 8 connects to the interior of U-tube 32 near elbow 29. The other end of U-tube 32 connects to a fluid jet catcher 33 which captures the jet emitted by nozzle 34.

To operate, high pressure fluid is applied to the high pressure supply line and electricity to the solenoid supply line 36. The vacuum pump attached to the interior of column 1 is started, and air is withdrawn from column 1. Since the bottom of column is joined to tank 2, which is filled with fluid, fluid rises in column 1 as tank 2 is vented to the atmosphere. The pressure in tank 2 is thus constant at atmospheric pressure. The pressure is thus reduced at the top of column 1, resulting in a suction down waste line 8 and jet catcher 33. The hole in jet catcher 33 is sufficiently small to maintain the suction. The level of fluid in column 1 thus can control the vacuum pump to maintain a constant suction. To cut a workpiece, the operator inserts the workpiece between nozzle 34 and catcher 33. The workpiece can be supported, and complete freedom of movement is possible under the area defined by booms 11 and 21. The operator then operates switches on handles 25 and 26, which actuate solenoid 31, which in turn starts the flow of high pressure fluid out of nozzle 34. The cutting jet of high pressure fluid cuts through the workpiece, and enters jet catcher 33. The operator may drill, if desired, by inserting the workpiece, then activating the cutting jet without movement. By starting at the center, cutouts can also be made. Catcher 33 or nozzle 29 can optionally be equipped with pins to follow a track or guide which may be attached to the workpiece or work surface. Any dust or chips created by the cutting jet are forced into jet catcher 33. As jet catcher 33 is vented into U-tube 32, which in turn connects to waste line 8, all chips, dust and excess fluid are withdrawn by suction down U-tube 32 and line 8 into the top of column 1. Due to the high velocity and energy of the cutting jet the fluid is primarily in mist or vapor form. Upon entering column 1, the waste separates into its component parts with the air and any volatile wastes remaining at the top of column 1, ultimately to be withdrawn by the vacuum pump and the liquid and solid components at the base of column 1 and into tank 2. As the level of fluid in tank 2 cannot exceed the height of overflow tube 3, the solid and liquid wastes are eventually flushed out tube 3, as there is a constant input of fluid. When the device is shut off, the level of fluid in column 1 drops and flows into tank 2. Tank 2 has sufficient capacity to provide fluid for column 1 upon restarting.

Figure 2:
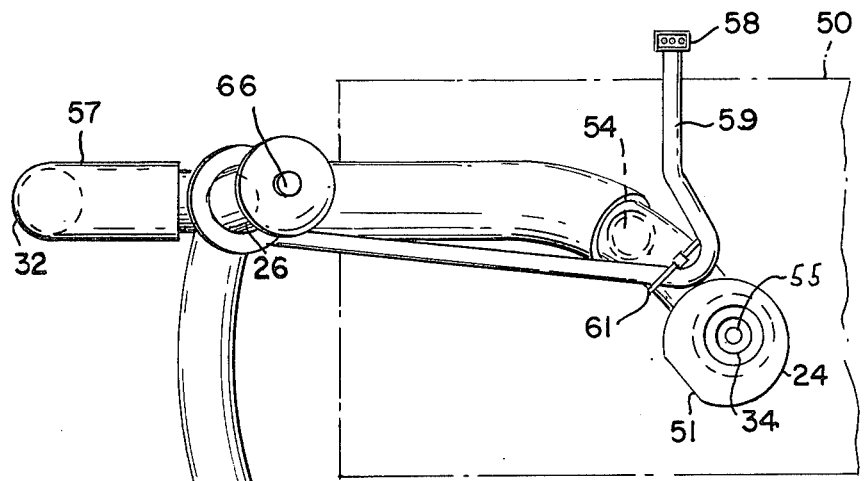
FIG. 2 is a plan view of the cutting head of the FIG. 1 device.

FIG. 2 is a top plan view of the cutting head of the device in use, cutting a workpiece 50. The X, Y and Z axis swivels and support system have been omitted for clarity, as have the continuations of supply and waste lines. Similarly, the solenoid that attaches to the top surface of elbow 52 is omitted as it would block the view of the other components.

High pressure fluid from the Z-axis swivel enters the cutting head at inlet 51 of elbow 29. A nozzle 34 passes through elbow 29 which functions as a nozzle holder. Inlet 51 is the outer threads of a female high pressure connector the male portion of which attaches to an inlet on the side of nozzle 34 in elbow 52 (not shown). An actuator from a solenoid or pneumatic device (not shown) passes through a hole 55 in the top of nozzle 34 to a valve in Nozzle 34. Elbow 29 is mounted on a U-tube 56, but the interior of U-tube 32 and elbow 29 are sealed from each other, since the interior of U-tube 32 operates at somewhat less than atmospheric pressure, and, elbow 29 is at full high pressure line pressure. U-tube 32 serves both as a support for the cutting head components and as a conduit for waste. Waste, dust, chips, fluid and air are withdrawn through waste outlet 54 located near the attached point of elbow 29. Waste outlet 54 vents to the interior of U-tube 32 which is a hollow, apprixmately U shaped tube. A portion of U-tube 32 may be covered with a sheath 57 to prevent damage to workpiece 50, or contact with the high temperatures present in U-tube 32. The electrical supply cable 59 runs for part of the way along U-tube 32, and is attached by a clip 61. Cable 59 terminates at one end with a connector 58 which allows attachment to the supply cable of the support system described above. The other end of cable 59 attaches to switches in handles 26 and 28. The cutting head provides two handles 26 and 28, which are attached to a handle bar 64. Each handle is provided with a push button 66 and 67, respectively. Handle bar 64 is attached to and supported by U-tube 32. The attachment may be by any conventional manner, such as, welding in a similar manner to the attachment of elbow 52. The handles 26 and 28 may be provided with an insulating gripping surface, or with molded grips. The cutting head is shown in position for drilling a hole in workpiece 50, or for beginning an interior cutout. For trimming or exterior cutouts, the cutting head is started at the edge of workpiece 50.

Figure 3:
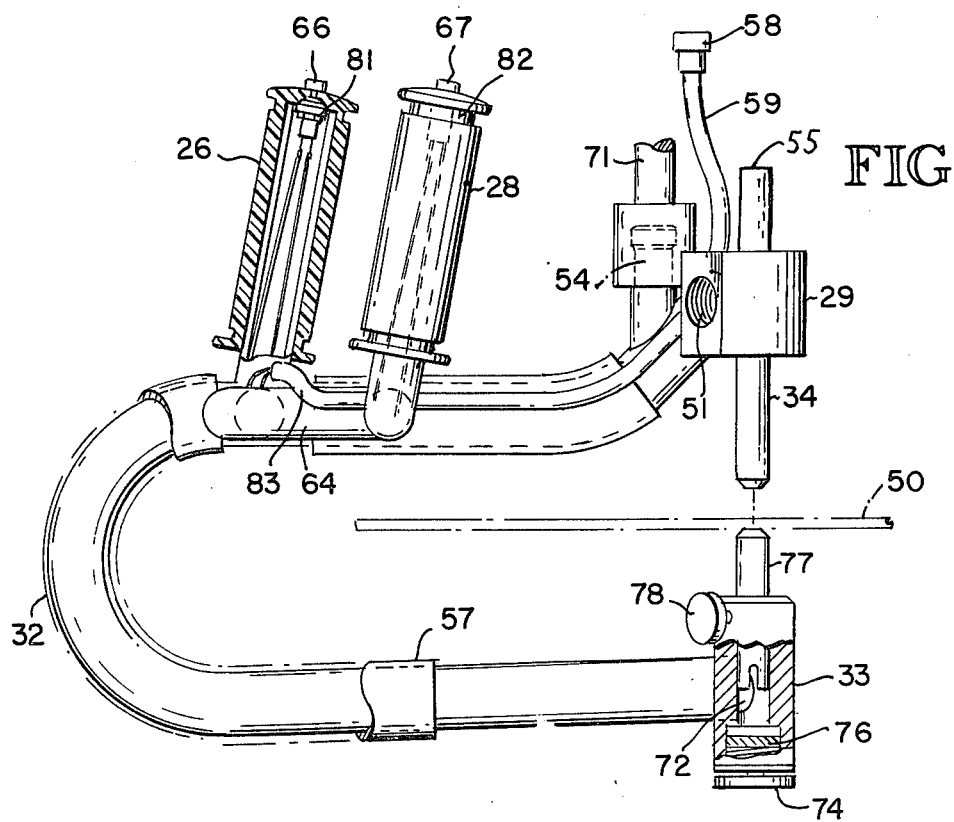
FIG. 3 is a side elevation view of the FIG. 2 device.

FIG. 3 is a side elevational view of the cutting head shown in FIG. 2. One handle is sectioned to show the interior as is the catcher. Again, for clarity the X, Y and Z axis swivels, solenoid, and the support system are not shown. Elbow 29 provides for the entry of high pressure fluid from the Z-axis swivel (not shown), which is attached to inlet 51 by a threaded connection in this embodiment, although other equivalent connection means could be used. Nozzle 34 attaches through the center of elbow 29. Nozzle 34 may be detachably connected to elbow 29 to provide different sized cutting jets. Nozzle 34 can be a combination nozzle on-off valve actuated by the solenoid or a separate valve nozzle arrangement could be used. It has been found suitable to use nozzles having bores of from 0.003 to 0.018 inches at 55,000 p.s.i., although other selections could be made for special purposes. The nozzle may be of jeweled orifice or other construction. U-tube 32 must mount elbow 29 rigidly, so that alignment is maintained between nozzle 34 and a catcher tube 77. The only exit from U-tube 32 is outlet 54 which is shown connected to waste line 71. As the pressures in U-tube 32 and waste line 71 are not extreme, a conventional low pressure connector may be used. As described above, electrical line 59 runs along U-tube 32 and enters handle 26. In handle 26 is a single pole push button switch 81, which connects to line 59. The other terminal of switch 81 connects to a wire that runs to a similar switch 82 in handle 28, a wire returns to 63 from switch 82. Switches 81 and 82 are thus wired in series with the solenoid. To actuate the cutting jet, both buttons 66 and 67 must be pushed. This is a safety feature, as the operator cannot, thus, get his hand in the path of the cutting jet, as both switches 81 and 82 are spring loaded, creating a dead man control. As an alternative, a pneumatic or hydraulic actuator could be substituted for the solenoid with an electrically actuated valve on the support column, and a flexible hydraulic or pneumatic line running along the booms to the actuator, which would be mounted to elbow 29. Cable 59 would then also carry a return wire from switches 81 and 82 to actuate the valve. Finally, the system could also be made entirely pneumatic or hydraulic with push button valves located in handles 26 and 28. The primary factor to consider in such control systems, is the safety aspect. The length of U-tube 32 determines how far one can cut into a workpiece 50. The longer U-tube 32 the greater the depth, but more unwieldy the tool, so such factors can be balanced for a particular use.

At the other end of U-tube 32 is mounted the jet catcher. In FIG. 3, the jet catcher is shown in a partially sectional view. After cutting workpiece 50, the cutting jet enters catcher tube 77, which is a hollow tube. Catcher tube 77 can be slid up and down in the hollow interior of the catcher body 33, and its position fixed by means of a set screw 78. This range of movement allows adjustment of the tool to differing thickness of workpieces 50, and minimizes the danger of contact with the cutting jet. After traversing catcher tube 77 and catcher body 33, the jet collides with an impingement disc 76. Impingement disc 76, of which there may be several absorb the excess energy of the cutting jet. As the impingement discs 76 are subject to wear by the jet, a removeable plug 74 is dismountably attached to catcher body 73 to allow their removal and replacement. Catcher tube 77 is provided with a slot at the end closest to the impingement disc 76, so that fluid from the jet can escape even if the bottom of the catcher tube 77 is in contact with impingement disc 76. Catcher body 33 is a hollow cylinder in this embodiment, sealed at one end by plug 74 and restricted by catcher tube 77 at the other end. The only outlet from the interior of catcher body 33 is outlet 72 which opens into the interior of U-tube 32 and serves as the exit for waste fluid, dust, chips and air.

In summary, the invention provides a tool with the flexibility of a hand router through the translational capability of the booms and the rotational ability of the swivels. This is combined with the ability to cut a wide variety of materials, safety, and with minimal generation of dust. The reactional thrust of the nozzle is directly opposed by the impact of the jet on the catcher which is attached to the nozzle by the U-tube, so that the operator can detect no opposition to his movement.

It will be understood that the invention may be embodied in other specific forms without departing from the spirit of the central characteristics thereof. The present examples and embodiments, therefore, are to be considered in all respects as illustrative and not restrictive, and the invention is not to be limited to the details thereof, but may be modified within the scope of the appended claims.

What is claimed is:
1. A fluid jet cutting apparatus comprising:
   a cutting head including a nozzle for forming a cutting jet for cutting a workpiece with a jet of high velocity fluid and a jet catching means for catching any cutting jet formed by said nozzle and support means for connecting said cutting jet to said jet cutting means; and,
   translation means for supporting said cutting head while allowing movement in two directions; and,
   rotational translation means connecting said translation means to said cutting head for allowing rotation in three perpendicular axes.

2. A fluid jet cutting apparatus as in claim 1, wherein said Rotational translation means allows rotation of 360° in each of the three perpendicular axes.

3. A fluid jet cutting apparatus as in claim 1, further comprising:
jet controlling means for controlling any flow of fluid through said nozzle; and,
means for connecting said jet controlling means to said support means.

4. A fluid jet cutting apparatus as in claim 3, wherein said jet controlling means is further comprising:
valve means connected to said nozzle for shutting on and off flow through said nozzle; and,
valve actuation means for actuating said valve means.

5. A fluid jet cutting apparatus as in claim 4, wherein said valve actuation means is further comprising:
a first handle having switch means connected to said support means for actuating said valve means; and,
a second handle having a switch connected to the switch in said first handle for preventing actuation unless an operators hands are on the first and second handles.

6. A fluid jet cutting apparatus as in claim 1, further comprising:
waste removal means connected to said cutting head for removing waste generated by said cutting head.

7. A fluid jet cutting apparatus as in claim 6, wherein said waste removal means is further comprising:
separation means for separating gaseous from liquid and solid waste; and,
a line connecting said cutting head to said separation means for conveying wastes; and,
a vacuum pump connected to said separation means for producing a suction down said line.

8. A fluid jet cutting apparatus as in claim 7, wherein said separation means is further comprising:
a column for seperating gaseous from solid and liquid wastes; and,
a tank connected to said column for providing a source of fluid for said column; and,
overflow means connected to said tank for fixing a maximum level of fluid in said tank.

9. A fluid jet cutting apparatus comprising:
a cutting head for cutting a workpiece with a jet of high velocity fluid; and,
translation means for supporting said cutting head while allowing movement in two directions; and,
support means for providing a first pivot point; and,
first boom means rotatably attached to said support means for allowing radial movement; and,
second boom means rotatably attached to one end of said first boom means for allowing movement of said cutting head in one plane; and,
means for connecting said cutting head to the end of said second boom means not connected to said first boom means; and,
rotational translation means connecting said translation means to said cutting head for allowing rotation in three perpendicular axes.

10. A fluid jet cutting apparatus as in claim 9, further comprising:
high pressure fluid supply line means attached to said first boom means and said second boom means and said cutting head for supplying high pressure fluid to said cutting head; and,
means connected to said supply line means for allowing movement of said supply line means in the plane defined by said first and second boom means.

11. A fluid jet cutting apparatus as in claim 10, further comprising:
second translation means connected to said high pressure supply line means for allowing movement of said cutting head in a plane perpendicular to the plane defined by said first and second boom means.

* * * * *